Figure 1:
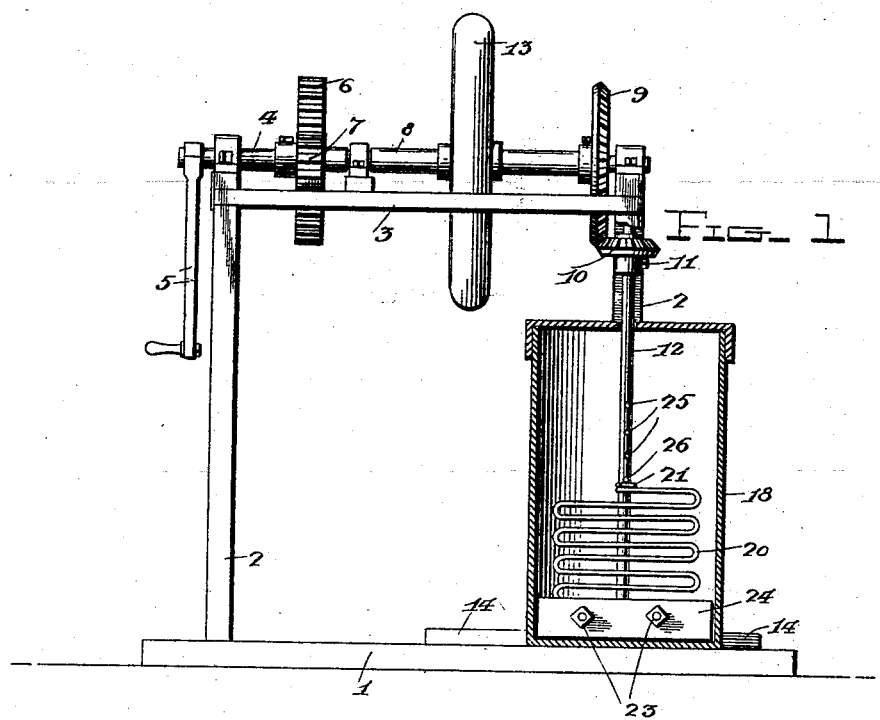

No. 622,985. Patented Apr. 11, 1899.
O. F. VAUGHAN.
CHURN.
(Application filed Aug. 22, 1898.)
(No Model.)

Witnesses

Inventor
Oscar F. Vaughan
by
H. B. Willson & Co.
Attorneys

UNITED STATES PATENT OFFICE.

OSCAR F. VAUGHAN, OF SHANNON, MISSISSIPPI.

CHURN.

SPECIFICATION forming part of Letters Patent No. 622,985, dated April 11, 1899.

Application filed August 22, 1898. Serial No. 689,183. (No model.)

*To all whom it may concern:*

Be it known that I, OSCAR F. VAUGHAN, a citizen of the United States, and a resident of Shannon, in the county of Lee and State of Mississippi, have invented certain new and useful Improvements in Churns, of which the following is a specification.

My invention relates to churns; and the object is to provide a simple, inexpensive, and effective device of this character.

To this end the invention consists in certain features of construction and combinations of parts, as will be hereinafter fully described and claimed.

In the accompanying drawings, the same reference characters indicate the same parts of the invention.

Figure 2:
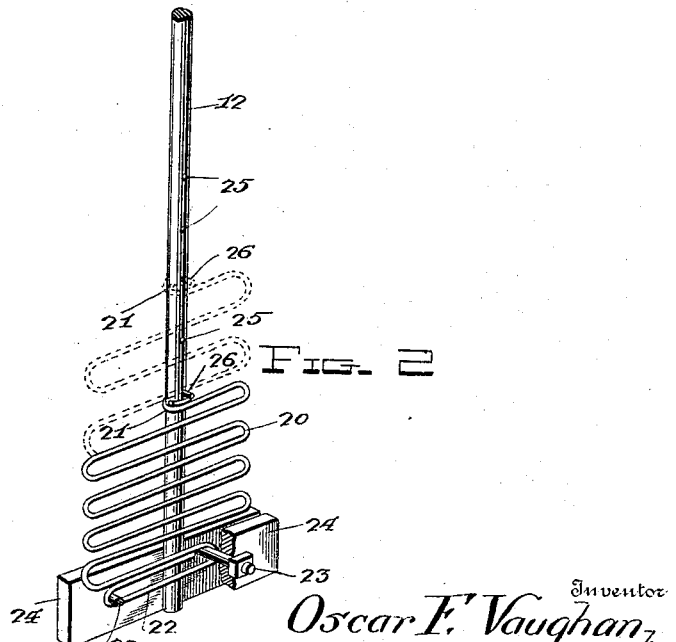

Figure 1 is a side elevation, partly in section, of a churn embodying my invention. Fig. 2 is a perspective view of the dasher detached from the churn.

1 denotes the base or platform on which the braced uprights 2 2 are fixed, and 3 denotes the horizontal frame supported by said uprights.

4 represents the main driving-shaft, journaled in suitable bearings fixed to the frame, and it is provided at its outer end with a crank-handle 5, and its inner end carries a spur gear-wheel 6, which meshes with a pinion 7, fixed on a counter-shaft 8, the opposite end of which carries a bevel-gear 9, which in turn meshes with a corresponding pinion 10, removably secured by a set-screw 11 on the vertical shaft 12.

13 represents the balance-wheel fixed on the counter-shaft 8, which is mounted in the same horizontal plane with the main driving-shaft 4.

14 14 denote parallel cleats fixed to the platform to receive the bottom of the cylindrical churn vessel 18, which is provided with the usual removable cover, as shown.

20 denotes the dasher, and it consists of a single continuous piece of semiflexible wire formed at its upper end with an eye 21, and it is then turned backward and forward in the same plane, somewhat like a gridiron, and its lower end terminates in a loop 22 to receive the bolts 23 23, which extend through the parallel transverse clamps 24 24, by means of which the dasher is removably secured to the shaft.

25 25 denote a series of transverse orifices in the dasher-shaft to receive the pin 26, which engages the eye 21 of the dasher and permits of its vertical expansion or elongation and contraction to correspond to the quantity of the contents in the vessel 18.

The accompanying drawings show my invention in the best form now known to me; but many changes in the details might be made within the skill of good mechanic without departing from the spirit of my invention, as set forth in the claim at the end of this specification.

Having thus fully described my invention, what I claim as new, and desire to secure by Letters Patent, is—

In combination, the vessel 18, the vertical shaft 12 and means for rotating said shaft within said vessel, the dasher 20 formed at its upper end with an eye 21 encompassing said shaft and at its lower end with a loop 22, the parallel clamps 24 24, arranged on each side of said shaft and the bolts 23 23 extending through said clamps and loop to secure the same to said shaft, substantially as shown and described.

In testimony whereof I have hereunto set my hand in presence of two subscribing witnesses.

OSCAR F. VAUGHAN.

Witnesses:
J. F. REDUS,
J. S. ABERNATHY.